(12) United States Patent
Gamble et al.

(10) Patent No.: US 10,658,167 B2
(45) Date of Patent: *May 19, 2020

(54) OFF-AXIS IONIZATION DEVICES AND SYSTEMS USING THEM

(71) Applicant: PERKINELMER HEALTH SCIENCES CANADA, INC., Woodbridge (CA)

(72) Inventors: Heather Gamble, Richmond Hill (CA); Gholamreza Javahery, Kettleby (CA); Lisa Cousins, Woodbridge (CA); Charles Jolliffe, Schomberg (CA)

(73) Assignee: PerkinElmer Health Sciences Canada, Inc., Woodbridge (ON) (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/147,683

(22) Filed: Sep. 29, 2018

(65) Prior Publication Data
US 2019/0189417 A1    Jun. 20, 2019

Related U.S. Application Data

(60) Provisional application No. 62/565,658, filed on Sep. 29, 2017.

(51) Int. Cl.
*H01J 49/14* (2006.01)
*H01J 27/20* (2006.01)
(Continued)

(52) U.S. Cl.
CPC ........ *H01J 49/147* (2013.01); *G01N 30/7206* (2013.01); *H01J 27/205* (2013.01); *H01J 49/0422* (2013.01); *H01J 49/145* (2013.01)

(58) Field of Classification Search
CPC .. G01N 30/7026; H01J 49/145; H01J 49/147; H01J 49/0422; H01J 27/025; H01J 27/205
See application file for complete search history.

(56) References Cited

U.S. PATENT DOCUMENTS 3,553,452 A * 1/1971 Tiernan .................. H01J 49/24
250/287
3,849,656 A * 11/1974 Wallington ............... H01J 5/02
250/424

(Continued)

FOREIGN PATENT DOCUMENTS

WO    WO-2007102204 A1 * 9/2007 ............ H01J 49/147

OTHER PUBLICATIONS

ISR/WO for PCT/IB2018/057599 mailed on Jan. 31, 2019.

*Primary Examiner* — David E Smith
(74) *Attorney, Agent, or Firm* — Rhodes IP PLC; Christopher R Rhodes

(57) ABSTRACT

An ion source comprising a chamber and an electron collector is described. In one configuration, the chamber comprises a sample inlet and an ion outlet. The chamber may also include an electron inlet configured to receive electrons from an electron source. The electron collector can be arranged in opposition to the electron inlet. The chamber can be configured to direct an electron beam from the electron source along a path with the chamber transverse to a path between the gas inlet and the ion outlet. The chamber may comprise an ion guide that includes a guide axis offset from an axis of the ion outlet.

20 Claims, 5 Drawing Sheets

(51) Int. Cl.
*G01N 30/72* (2006.01)
*H01J 49/04* (2006.01)

(56) References Cited

U.S. PATENT DOCUMENTS

| | | | | |
|---|---|---|---|---|
| 4,005,291 | A | * | 1/1977 | Arsenault ............. H01J 49/147 250/282 |
| 4,910,435 | A | | 3/1990 | Wakalopulos |
| 5,136,171 | A | * | 8/1992 | Leung .................. H01J 37/026 250/251 |
| 6,207,954 | B1 | * | 3/2001 | Andrien, Jr. ........ H01J 49/0009 250/282 |
| 6,294,779 | B1 | | 9/2001 | Apffel et al. |
| 2008/0116369 | A1 | * | 5/2008 | McCauley ............ H01J 49/145 250/288 |
| 2009/0008571 | A1 | * | 1/2009 | Matsuura ................ G01N 27/64 250/427 |
| 2009/0032702 | A1 | * | 2/2009 | Quarmby ............. H01J 27/205 250/288 |
| 2009/0194679 | A1 | * | 8/2009 | Doherty .............. H01J 49/0045 250/282 |
| 2011/0240848 | A1 | * | 10/2011 | Wells .................... H01J 49/145 250/283 |
| 2016/0247669 | A1 | * | 8/2016 | Tateishi ................ H01J 27/024 |

\* cited by examiner

OFF-AXIS IONIZATION DEVICES AND SYSTEMS USING THEM

PRIORITY APPLICATION

This application claims priority to, and the benefit of, U.S. Provisional Application No. 62/565,658 filed on Sep. 29, 2017, the entire disclosure of which is hereby incorporated by reference.

TECHNOLOGICAL FIELD

This application relates to systems and devices that can ionize one or more samples. More particularly, certain configurations of an ion source that can provide ions using electron impact ionization and/or chemical ionization are described.

BACKGROUND

Conventional mass spectrometry techniques rely on the formation of analyte ions for analysis. Numerous ionization techniques—such as electrospray ionization, chemical ionization, and electron impact ionization techniques are known. Existing techniques, however, often lack flexibility.

SUMMARY

Certain aspects, configurations, features and embodiments of ion sources and systems using them are described herein.

In an aspect, an ion source comprises a chamber and an electron source. In some examples, the chamber comprises a sample inlet configured to receive a sample comprising an analyte, the chamber further comprising an ion outlet configured to provide ions from the chamber. In certain configurations, the electron source can comprise a conductive helical coil configured to provide a magnetic field that accelerates electrons into the chamber. In certain embodiments, the chamber further comprises an electron inlet and an electron collector opposite the electron inlet. In some instances, the electron collector and the electron inlet are arranged to direct an electron beam from the electron source through the electron inlet and along a path transverse to a path between the sample inlet and the ion outlet of the chamber.

In certain embodiments, the sample inlet can be positioned generally opposite the ion outlet. In other embodiments, the sample inlet can be configured to receive a sample from a gas chromatograph. In some examples, the electron source comprises a lens at the ion outlet, e.g., a lens is configured to focus ions from the ion source. In some embodiments, the chamber further comprises a charge plate configured to accelerate ions in the chamber. In other examples, the chamber comprises at least two separate electron inlets spaced along one side of the chamber. In some examples, the chamber comprises a second sample inlet configured to receive a second source of analyte.

In certain embodiments, the chamber further comprises a gas inlet configured to provide a gas coaxially with the second sample introduced into the chamber. In some examples, the gas inlet is configured to provide a reactant gas to react with analyte in the chamber. In other examples, the gas inlet is configured to provide a bombarding gas.

In another aspect, an ion source comprises first and second opposing chambers. In one configuration, each of the first and second opposing chambers comprises a sample inlet each configured to receive a sample comprising an analyte. Each of the first and second opposing chambers may further comprise an ion outlet. In some examples, each of the first and second opposing chambers further comprise an electron inlet configured to receive electrons from a respective one of first and second electron sources. The ion source may also comprise an electron collector common to the first and second opposing chambers and arranged in opposition to the electron inlet of each of the first and second chambers. In some instances, the electron collector is arranged to direct an electron beam from each of the first and second electron sources along a path transverse to a path between the sample inlet of each chamber and the ion outlet of each chamber.

In some embodiments, the ion outlet of each of the first and second opposing chambers provides ions to a mass analyzer fluidically coupled to the ion source. In other embodiments, the ion outlet of each of the first and second opposing chambers provides ions to a first multipole ion guide positioned between the mass analyzer and the ion source. In certain examples, the first multipole ion guide comprises a plurality of tilted rods. In other examples, each of the plurality of tilted rods has a cross-section that varies along its length.

In some examples, each of the first and second chambers comprises a focusing lens at its ion outlet. In other embodiments, the sample is received from a gas chromatograph. In some examples, the electron source comprises a conductive helical coil comprising a longitudinal axis along which electrons are accelerated by a magnetic field. In certain embodiments, the chamber further comprises a charge plate configured to accelerate ions in the chamber.

In other examples, the second opposing chamber is configured to receive a gas to interact with the analyte in the sample. In certain examples, the gas is selected to be a reactant gas. In other examples, the gas is selected to bombard the analyte. In some embodiments, the ion source comprises a voltage source configured to provide a potential between 0 and 250 V to the electron collector.

In another aspect, an ion source comprises a chamber, an electron collector and an ion guide. In certain configurations, the chamber comprises a sample inlet configured to receive a sample comprising an analyte. The chamber may comprise an ion outlet configured to provide ions along an outlet axis. The chamber may comprise an electron inlet configured to receive electrons from an electron source. In some examples, the electron collector can be arranged in opposition to the electron inlet and arranged to direct an electron beam from the electron source along a path with the chamber transverse to a path between the sample inlet and the ion outlet. In certain examples, the ion guide comprises a guide axis offset from the outlet axis. In some embodiments, the ion guide can be configured to guide ions provided along the outlet axis to the ion guide axis.

In certain embodiments, the ion source may comprise a second chamber comprising a second sample inlet configured to receive a sample comprising an analyte and comprising a second ion outlet opposite the second sample inlet. In some examples, the second chamber is configured to provide ions along a second outlet axis, offset from the outlet axis and offset from the ion guide axis. In other examples, the second chamber further comprises a second electron inlet configured to receive electrons from an electron source and comprises a second electron collector arranged in opposition to the second electron inlet. In some examples, the second chamber is arranged to direct an electron beam from the second electron source along a path within the second chamber transverse to a path between the second sample inlet and the second outlet axis. In other example, the ion guide is further configured to guide ions provided along the second outlet axis to the ion guide axis.

In some examples, the ion guide comprises a plurality of rods arranged in a multipole around the ion guide axis. In other examples, each of the rods is tilted relative to the ion guide axis. In certain embodiments, the electron source comprises a conductive helical coil comprising a longitudinal axis along which electrons are accelerated by a magnetic field. In some embodiments, the chamber further comprises a charge plate configured to accelerate ions in the chamber.

In further examples, the ion source may comprise an additional ion chamber configured to provide a third source of ionized analyte along an axis offset from the first outlet axis, the second outlet axis, and the ion guide axis. In some embodiments, the additional ion chamber is configured to provide the third source of ionized analyte using electron ionization or chemical ionization or both. In other examples, the additional ion chamber comprises one of an electrospray ionizer, an atmospheric pressure chemical ionizer, and an atmospheric pressure photo ionizer.

In another aspect, a mass spectrometer comprises a sample introduction device, an ion source, a mass analyzer and a detector. In some embodiments, an ion source, as described herein, can be fluidically coupled to the sample introduction device. In other embodiments, the mass analyzer can be fluidically coupled to the ion source. In additional examples, detector can be fluidically coupled to the mass analyzer. In some instances, the mass spectrometer may comprise a processor electrically coupled to one or more of the components, e.g., the ion source.

Additional aspects, embodiments, examples and features are described in more detail below.

BRIEF DESCRIPTION OF THE DRAWINGS

Certain configurations are described to illustrate some of the novel and inventive features of the technology described herein with reference to the accompanying figures in which.

DETAILED DESCRIPTION

Figure 1:
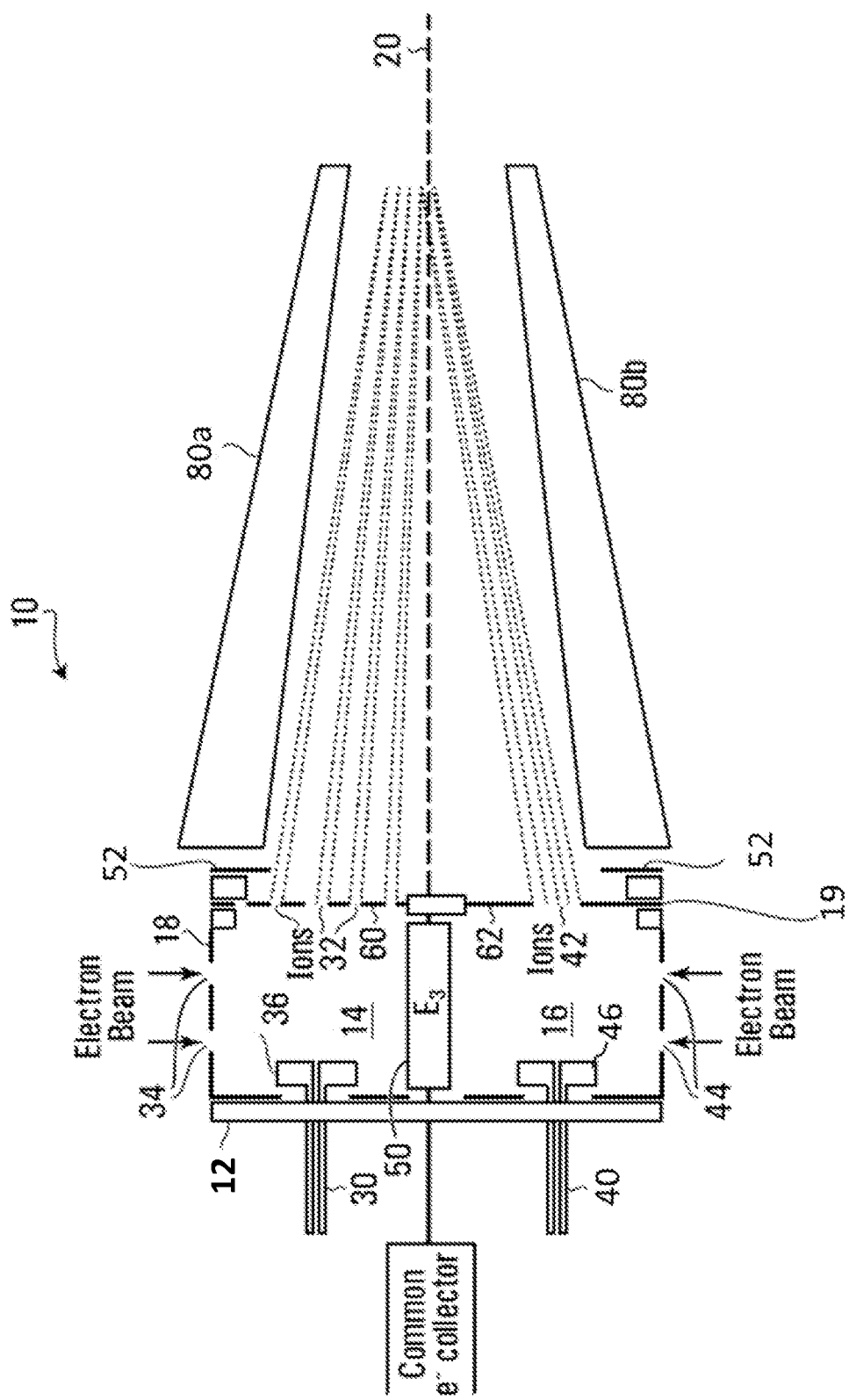
FIG. 1 is a schematic block diagram of a combined electron ionization/chemical ionization source, in accordance with some examples.

FIG. 1 illustrates an example ion source 10 that may be used to produce ionized analyte by way of either electron impact ionization, chemical ionization or both. As illustrated, ion source 10 includes an outer housing 18 defining a dual ionization chamber 12. Dual ionization chamber 12 includes a first chamber 14 and a second chamber 16, vertically offset from each other, and offset relative to an ionizer outlet axis 20.

Housing 18 may be generally rectangular (with square or rectangular faces) or cylindrical in shape, formed of a generally conductive material, such a metal or alloy. Example dimensions for housing 18 may be between about 10 mm and 200 mm. In an embodiment, dimensions of housing 18 may be 24.5 mm×12 mm×25.4 mm. In alternate embodiments, housing 18 may have other shapes—for example symmetrical about a plane—and may be right cylindrical (with circular, elliptical, rectangular, or other shaped base), spherical, or the like.

As will become apparent, first chamber 14 is well suited for electron impact ionization, while chamber 16 is well suited for chemical ionization, First chamber 14 includes an analyte inlet 30, and one or more sample outlet(s) 32 (individually and collectively outlet 32), to transmit analyte ions, located on generally opposing sides of first chamber 14 and housing 18.

Analyte inlet 30, e.g., an inlet fluidically coupled to a gas chromatography device or system, may be supplied by a suitable source of analyte—for example in gaseous form. Analyte, may for example, be supplied from a gas chromatograph. A chromatograph or other separation device is not strictly required, though it is often helpful for eliminating undesired background and to separate analytes of interest in time. Analyte could, alternatively, be introduced in a flow and/or pressure regulated ingress of ambient air, or sample could be introduced directly using a syringe or other manual sample introduction device.

Analyte travels from inlet 30 on one side of first chamber 14 to the opposite side and is ionized along its path.

A charged element 36, e.g., an ion repeller, having a voltage applied thereto, may accelerate ionized analyte within first chamber 14, as it travels toward sample outlet 32. Charged element 36 may have any suitable geometry. In one embodiment, charged element 36 may be a hollow cylinder—having for example, an outer diameter of 2.2 mm and a length of 4-8 mm—with cylinder axis oriented toward sample outlet 32, positioned so that the analyte travels through charged element 36 upon entering first chamber 14. A suitable voltage may be applied to charged element 36. For example, a voltage between about −400 to +400V may be applied.

Figure 2:
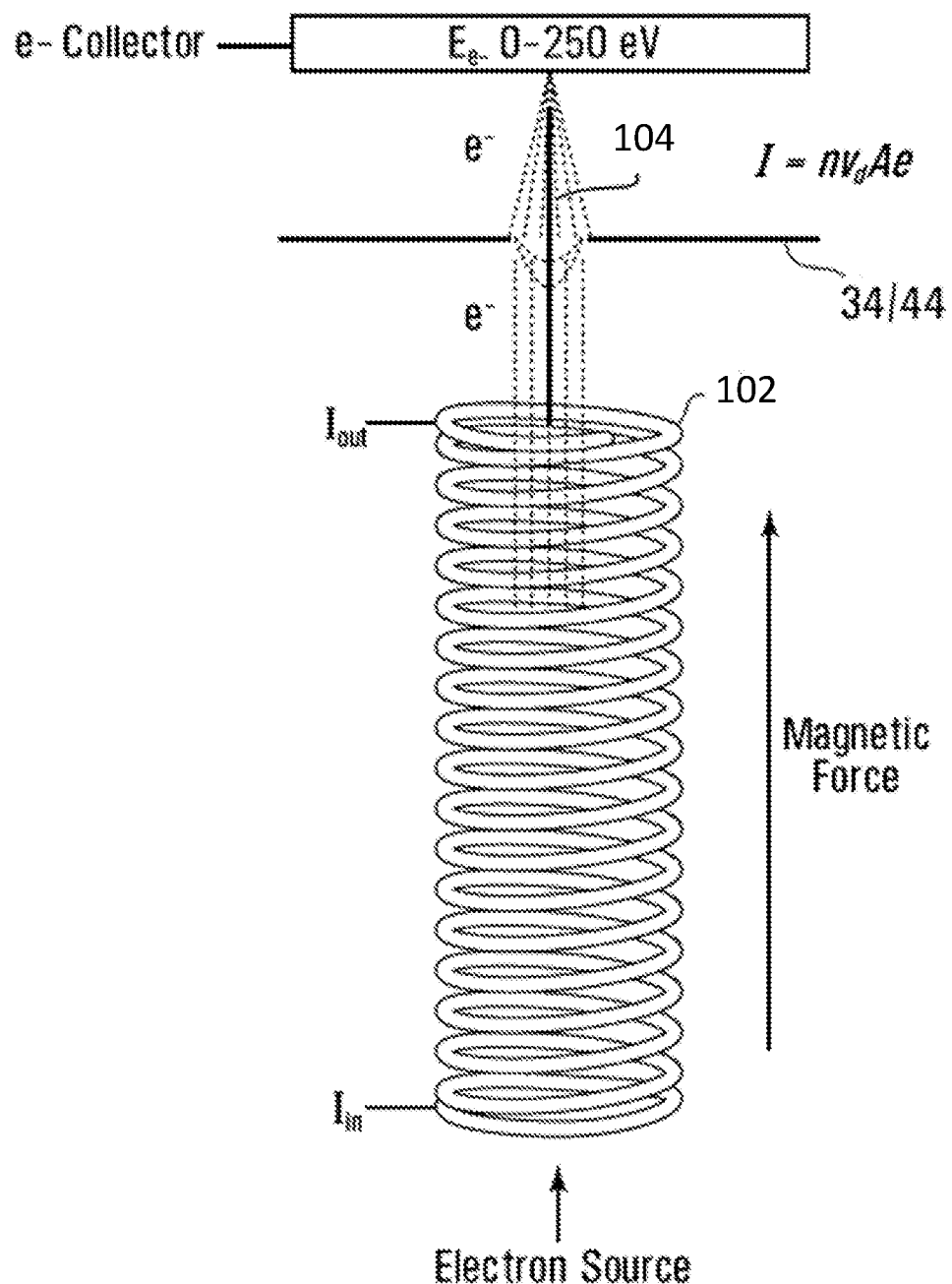
FIG. 2 is a schematic block diagram of an electron accelerator of the ionization source of FIG. 1.

One or more electron inlets 34 is/are on a further, third side of chamber 14, and allows the introduction of electrons along a path generally transverse to the path between analyte inlet 30 and sample outlet 32. Electrons introduced by way of inlets 34 may bombard analyte as it passed from inlet 30 to sample outlet 32. An example electron source and accelerator used to feed electron beams to electron inlets 34 are depicted in FIG. 2, and are described below. Electron inlets 34 may act as focusing lenses for introduced electrons. To that end, electron inlets 34 may be formed in a conductive plate or portion thereof that may be electrically isolated from the remainder of chamber 14. Electron inlets 34 may be positioned to allow electrons generated by each to pass through. A suitable voltage—for example in the range 0 to +400 V—could be applied to the plate, or the plate could be grounded.

An electron collector 50 is located opposite electron inlet 34, and may aid in accelerating and steering electrons. Electron collector 50 may take the form a conductive plate within chamber 14, having a voltage applied thereto. A suitable voltage may be applied to collector 50. In the depicted embodiment of voltage of between 0-250 volts may be applied.

As will be appreciated, electron bombardment of analyte aids (or causes) its ionization.

Analyte outlet 32 is formed in a wall of first chamber 14, defining a first focusing lens 60. Focusing lens 60 may formed as an opening in an electrically isolated portion of the wall, isolated from the remainder of chamber 14. Again, suitable voltages may be applied to focusing lens 60 to aid in the extraction of analyte through lens 60. Example voltages may again be within the range −400 to +400V.

Focusing lens 60 causes exiting ionized analyte molecules to leave first chamber 14, with generally aligned velocities along an outlet axis, normal to the wall of focusing lens 60, and at the center of focusing lens 60.

A suitable pressure and flow regime may also assist in the flow of analyte. For example, flow rates from a suitable gas chromatography source could be 1-3 atm cc/min. Pressures within first chamber 14 could be in the range $10^{-6}$ to $10^{-3}$ Torr.

Second chamber 16 includes an analyte inlet 40, and ionized sample outlet(s) 42, located on generally opposite sides of second chamber 16. Sample outlets 42 may be numerous, and may be arranged in a wall of housing 18, that has been machined to act as an exit lens 19.

Analyte inlet 40 may be supplied by a suitable source of analyte—for example in gaseous form. Analyte may, for example, again be supplied from a gas chromatograph. Again, a chromatograph or other separation device is not strictly required, though it is often helpful for eliminating undesired background and to separate analytes of interest in time. Analyte could, alternatively, be introduced into second chamber 16 in a flow and/or pressure regulated ingress of ambient air, or sample could be introduced directly using a syringe or other manual sample introduction device.

Analyte inlet 40 may further allow the introduction of a second gas that may interact and react with introduced analyte to cause chemical ionization within second chamber 16. The second gas may be a bombardment gas, or a reaction gas. The second gas may, for example, be introduced co-axial with the introduced analyte. As will be appreciated, a suitable second gas could otherwise be introduced into second chamber 16, for example, by way of a further gas inlet (not shown) proximate analyte inlet 40 or elsewhere on the walls of chamber 16.

The second gas may chemically react with the analyte gas (thereby acting as a reaction gas), or simply physically bombard the analyte gas (thereby acting as a bombardment gas).

In chemical ionization within chamber 16, ions may be produced via collision of (neutral) analyte molecules with ions generated from an introduced reactant gas. Example chemical reactant gases are $CH_4$, $NH_3$, and isobutane. The reactant gas is typically introduced in far excess to the target analyte so that incoming electrons preferentially ionize the reactant gas. Once the reactant gas is ionized, a variety of chemical reactions with the target analyte may occur, such as protonation $[M+XH^+ \rightarrow M-H^+ +X]$, hydride abstraction $[MH+X^+ \rightarrow M^+ +XH]$, adduct formation $[M+X^+ \rightarrow M-X^+]$, charge exchange $[M+X^+ \rightarrow M^+ +X]$. M, MH represents the analyte, while $XH^+$, $X^+$ are species derived from the reactant gas.

A bombarding gas could be a noble gas (He, Ne, Ar, Kr, Xe), an inert gas such as $N_2$, or a simple diatomic gas such as NO, CO. If a bombarding gas is used, the bombarding gas is ionized, then selectively used to ionize analytes depending on the relative ionization energies: $X+e^- \rightarrow X^+$ (ionization of bombarding gas). $X^+ +M \rightarrow M^+ +X$ (if ionization energy of analyte M<ionization energy of bombarding gas X). Otherwise there is no reaction. Different bombarding gases have different inherent ionization energies.

Analyte and reaction/bombardment gas travel from inlet 40 on one side of chamber 16 to the opposite side and is ionized along its path. Again, an electrically charged element 46, having a voltage applied thereto, may accelerate ionized analyte and second gas within second chamber 16, as it travels toward sample outlet 42.

As will now be appreciated, the pressures within second chamber 16 may be higher than within first chamber 14, as second chamber 16 is used for chemical ionization, while first chamber 14 is used for electron impact ionization. Typical pressures within chamber 14 may be maintained between $10^{-6}$ to $10^{-4}$ Torr.

For example, flow rates from a suitable gas chromatography source into chamber 16 could be 1-3 atm cc/min. Pressures within second chamber 16 could be in the range 0.1 to 1.0 Torr.

Pressures in chambers 14 and 16 may be maintained by balancing inlet flows from the GC inlets, and any auxiliary gas inlets (not shown) against the effective pumping speeds. The maximum achievable pumping speed in the ion guide region will be determined by the capacity of the vacuum pump or vacuum pump stages associated with the downstream pressure region of the analyzer, but can be throttled by selecting smaller and/or fewer apertures in the exit lens for each chamber.

The geometry of outlets 42 of second chamber 16 determines, at least in part, the typical pressures within second chamber 16. A different total outlet aperture size of outlets 42 may therefore sustain a higher pressure inside chamber 16. Example diameter of outlets 42 may be between 0.5 and 5 mm for circular aperture, or equivalent from different shaped or multiple apertures.

In some examples, charged element 46, like charged element 36, could also be formed as a hollow cylinder with an outer diameter of 2.2 mm and a length of 4-8 mm, with cylinder axis oriented towards the sample outlet 42, positioned such that the analyte travels through charged element 46 upon entering second chamber 16. The applied voltage could be in the range −400 to +400V.

One or more electron inlets 44 is/are on a further, third side of second chamber 16, and allow the introduction of electrons along a path generally transverse to the path between analyte inlet 40 and sample outlet 42. Introduced electrons, may be accelerated prior to introduction into chamber 16, and within chamber 16, and thus bombard analyte (and introduced reaction/bombardment gas) as they pass from inlet 40 to outlet 42. Electron bombardment may aid in ionizing both analyte and reaction/bombardment gases, and thus aid in the ionization of analyte by electron bombardment, and the chemical ionization of analyte introduced by way of inlet 16.

Electron collector 50 is also located opposite electron inlet 44 and may aid in steering electrons. Electron collector 50 may be formed as a conductive plate, with a voltage applied thereto. In the depicted embodiment, electron collector 50 is common to both chambers 14 and 16, and may for example be coextensive with the interior end-wall of each chamber 14/16. As discussed above, an appropriate voltage may be applied to electron collector 50 to attract and accelerate electrons on their path from electron inlet to collector 50. For example, a voltage between 0-250V DC may be applied. If desired, each of the chambers 14, 16 may comprise its own respective electron collector.

Electrons may be introduced into electron inlets 34, 44 of first chamber 14 and second chamber 16, respectively by way of an electron source, including an electron accelerator 100. In the depicted embodiments, each chamber 14 and 16 receives electrons from four electron sources/accelerators 100.

An example electron accelerator 100 is illustrated in FIG. 2, and takes the form of conductive helical coils 102, wound around an axis generally parallel to the travel axis of electrons within chambers 14, 16. Coils 102 may be wound to form a void 104 of about millimetre size (e.g. 0.5 to 3 mm, in one embodiment, about 1 mm), and at winding density of about 10 turns per cm. As will be appreciated, any applied electrical current to coil 102, in turn generates a magnetic field generally along axis 104. A series resistance, or inherent resistance of coil 102, may limit the current flowing into coil 102. The magnitude of the magnetic field may be controlled by the current provided to coil 102, in manners appreciated by those of ordinary skill. Electrons, from a source (not shown) of electrons are introduced along axis 104, and focused as an electron beam, accelerated by the magnetic field, prior to introduction of the electrons into electron inlets 34, 44, of chambers 14, 16. Accelerated electrons may thus enter chamber 14/16, with an initial well defined velocity, to collide with analyte (and reaction gas) traversing from inlet 30/40 to outlet 32/42.

As will be appreciated, accelerator 100 may accelerate electrons by way of the Lorentz force—$F=qv \times B$ where F, v, and B represent the electron velocity vector, and the magnetic field vector, of the magnetic field generated by coils 102. Their vector cross product (scaled by the electron charge) determines the force on an electron. The resultant force F is perpendicular to both the velocity v of the particle with charge q, and the magnetic field vector B. As a consequence, the electron velocity is constrained to a direction along axis 104, or to circular motion centered around the axis 104 of coil 102 with F acting as a centripetal force. Coil 102 would be wound about a straight axis. However, other geometries, in which coil 102 is wound about a non-linear axis may be possible—coil 102 could, for example, be wound around an arc, curve or the like.

Referring again to FIG. 1, outlet 42, like outlet 32, is formed in a wall defining a second focusing lens 62, for focusing analyte exiting second chamber 16. A suitable voltage may be applied to the wall, to aid in ion extraction. Outlet 42 and outlet 32 are off-axis from each other, and from axis 20.

A common extraction lens 52 is formed downstream of the outer wall of chamber 18. Extraction lens 52 may have an oblong opening which could have dimensions of around 7 mm×17 mm. Extraction lens 52 is again electrically isolated from chamber 18—for example by way of a ceramic insulator, and a suitable voltage may be applied. As should now be apparent, charged element 36, 46, exit lens 60, and/or extraction lens 52 serve to guide analyte/ions across chamber 18. That is, analyte is ionized by the electron beam, then directed towards the outlet by applying suitable voltages to these elements. Notably, chamber 14 is located above a downstream analyser axis 20 while chamber 16 is below axis 20. Ions exiting chambers 14, 16 thus exit off-axis (i.e. not on axis 20).

Figure 3:
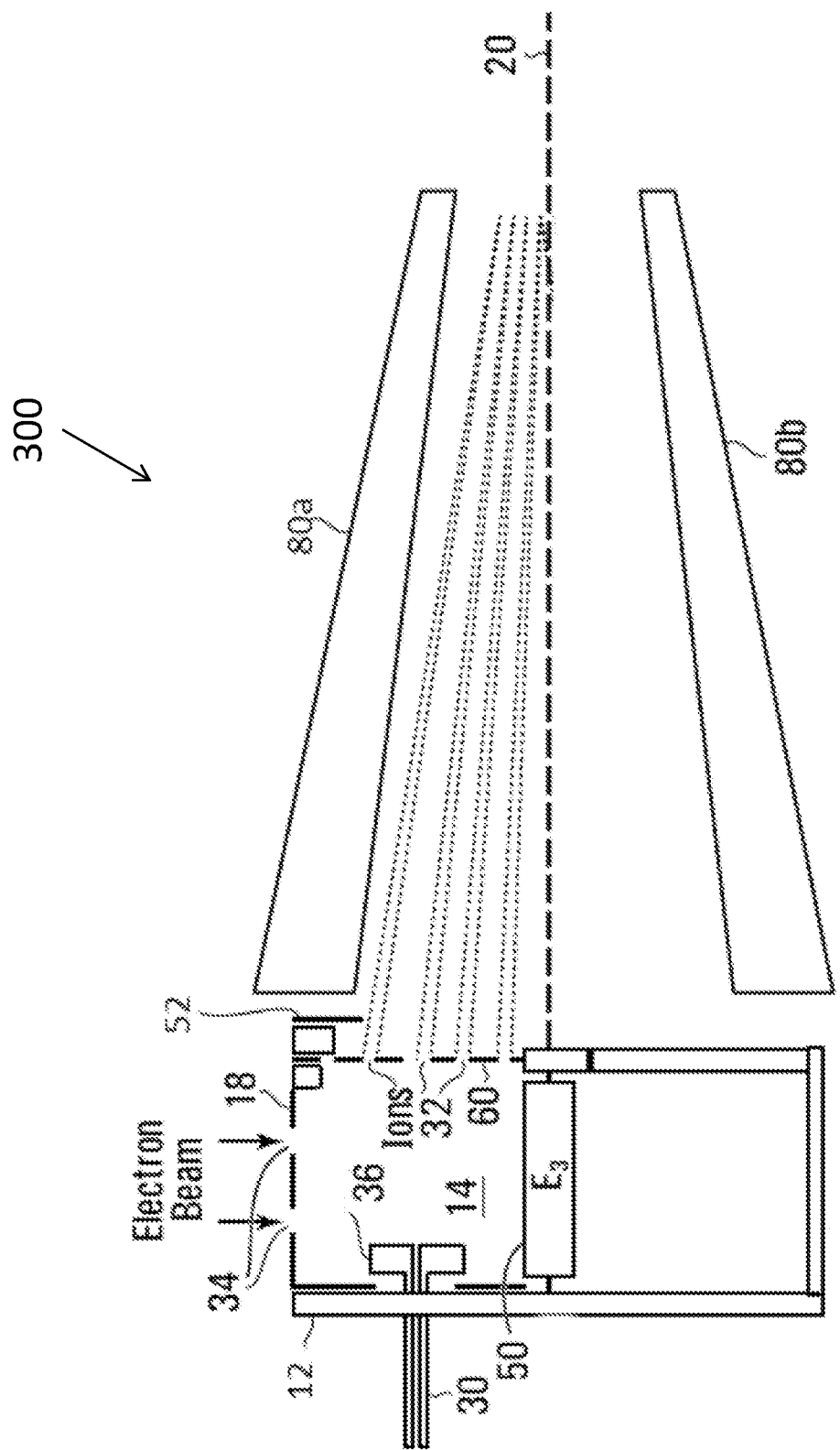
FIG. 3 is another block diagram of an electron ionization (or chemical ionization) source, in accordance with certain embodiments.
Figure 4:
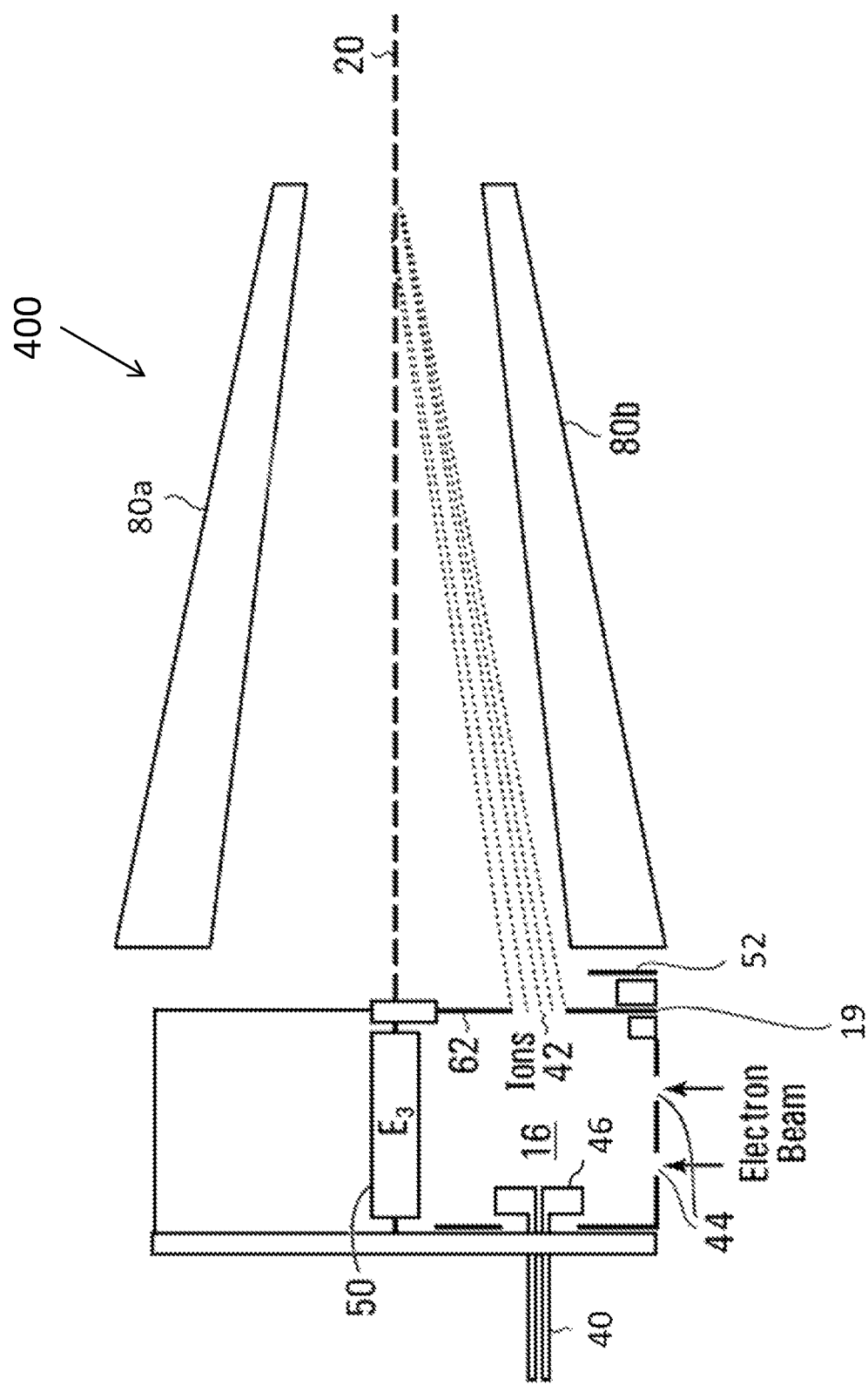
FIG. 4 is an additional diagram of an electron ionization (or chemical ionization) source, in accordance with certain embodiments.

In certain configurations, a suitable ion guide may bring ions from their outlet axes, onto axis 20. In the depicted embodiment, two outlets (i.e. that of chamber 14 and 16) are off-axis (i.e. off axis 20) or offset from the axis 20. In other embodiments, a single ionization source may release ions off-axis as is shown in each of FIGS. 3 and 4. In other embodiments, three or more ionization sources may release ions off-axis, all to be brought along axis 20, by a suitable ion guide. For example, a third electron impact, chemical ionizer, electrospray ionizer; an atmospheric pressure chemical ionizer (APCI), and an atmospheric pressure photo ionizer (APPI) may be provided off-axis, using appropriate pumping and ion transport, as is known in the art.

In certain examples, several guide rods 80*a*, 80*b* (individually and collectively guide rods 80) are positioned around axis 20, to provide ion containment and transport along guide axis. Radiofrequency voltages may be applied to opposite pairs of rods to aid in ion containment, as is known in the art. The exact shape and configuration of the guide rods used may vary, and illustrative shapes include, but are not limited to, straight rods, tilted rods, segmented rods, segmented rods with decreasing radius. Guide rods may be in pairs of two, three, four and higher order. Guide rods may be tapered, tilted and tapered and tilted, to concentrate ions on axis. Guide rods may be ion funnels with RF voltage applied to plates rather than rods. Guide rods may be segmented with decreasing ro. Guide rods may be in pairs of two, three, four and higher order. For example, concentrating ion guides are, detailed in U.S. Pat. No. 7,569,811 (the '811 Patent), the contents of which are hereby incorporated by reference. Only two rods 80*a*, 80*b* are visible in FIG. 1 for illustration purposes. However, rods 80*a*, 80*b* are typically arranged in multipole (e.g. quadrupole) around axis 20. Rods 80*a*, 80*b* are arranged in multipolar arrangement and a containment field is applied to each of the rods 80*a*, 80*b* to contain charged ions within a containment area proximate axis 20, as detailed in the '811 Patent.

Other rod geometries may alternatively be used. For example, rods with circular cross section along their central axis may be employed. Likewise, rods with square or rectangular cross-sections, arranged at a tilt angle may be employed. Other rod geometries that serve to ions released from chamber 14, 16 generally along their outlet axes to the ion guide axis 20.

In some instances, the rods 80*a*, 80*b* can be omitted entirely with the ions exiting the chambers 14, 16 being providing to a downstream component as noted in more detail below.

In use, chambers 14 and 16 may be concurrently or sequentially used thereby allowing for electron impact ionization in chamber 14, and immediately subsequent or even concurrent chemical ionization in chamber 16. Analyte may be provided to each of chambers 14, 16 by way of inlets 30, 40. Ions exiting chamber 14 exit above axis 20, while ions exiting chamber 16 on an opposite side of axis 20 (i.e. below axis 20). Focusing lenses 60, 62, and common focus lens 52 generally focus ions exiting chambers 14, 16 and primarily to accelerate ions "downstream", in a direction generally parallel to axis 20. This helps bring ions into ion guide defined by rods 80*a*, 80*b*.

In certain configurations, the containment field created by rods 80*a*, 80*b*, in turn, directs ions toward analyser axis 20, and contain the ions about axis 20. Further, as detailed in the '811 Patent, rods 80*s*, 80*b* may further create an axial field, generally along axis 20, to transport ionized analyte along axis 20.

In certain examples, chambers 14 and 16 may be housed in a vacuum chamber pumped by a turbopump (not shown) to yield the desired background pressure. Rods 80*a*, 80*b* may be pressurized by being housed in a separate pressurized housing (not shown) to further aid in concentrating or focusing ions along guide axis 20. Axial field may be utilized to drive ions out the exit as is known in the art.

Other ion guides that serve as focusing structures to bring ions on axis 20 will be selected by the skilled person in the art, given the benefit of this disclosure. For example, an ion funnel, lens stack, or skimmer cone may all serve as an ion guide to bring ions on axis 20. Example, ion funnels, skimmers, and multipole ion guides are all discussed in Chen et. al., Anal. Chem. 2015, 87, 716-722 (http://pubs.acs.org/doi/pdf/10.1021/ac503564c ACS open source publications), the contents of which are hereby incorporated by reference. One or more suitable voltage sources (not shown) may be use to apply required currents/voltages to accelerator(s) 100, electron collector 50, and rods 80$s$, 80$b$.

Figure 5:
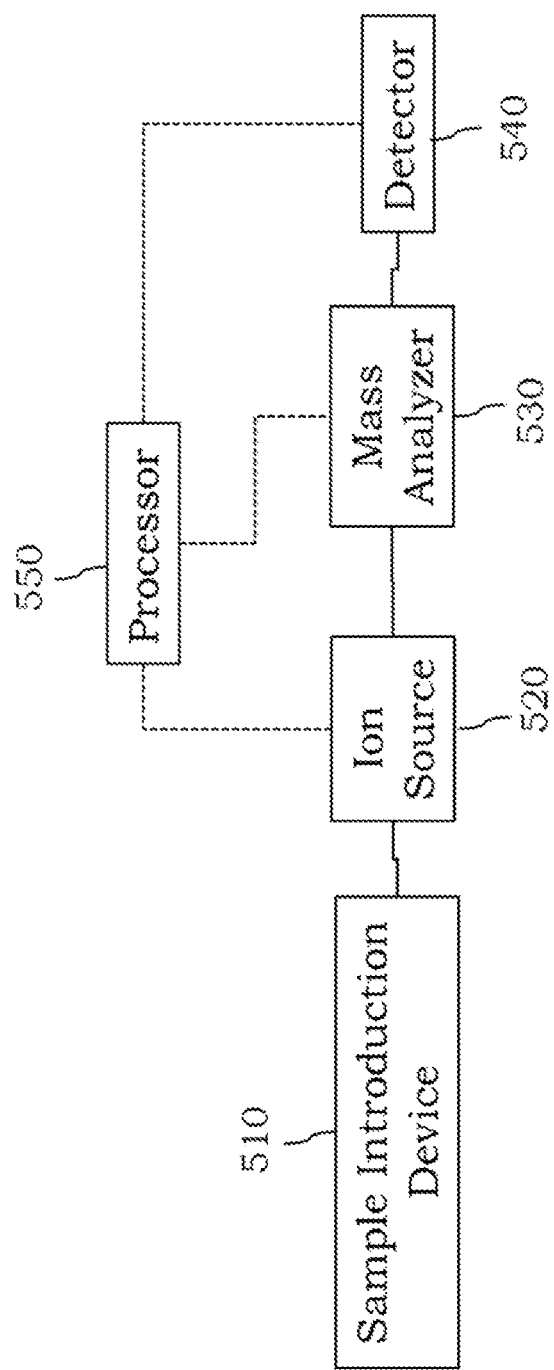
FIG. 5 is a block diagram of a mass spectrometer system, in accordance with some embodiments.

In certain examples, the ion sources described herein can be used in or with a mass spectrometer. A block diagram of a mass spectrometer is shown in FIG. 5. The system 500 comprises a sample introduction device 510 fluidically coupled to an ion source 520, e.g., an ion source as described herein. The ion source 520 is fluidically coupled to a mass analyzer 530. While not shown, lens elements, ion guides, collision cells and the like may be present between the ion source 520 and the mass analyzer 530. The mass analyzer 530 is coupled to a detector 540. The system 500 can be controlled using a processor 550, which can be electrically coupled to one or more components of the system 500.

In certain examples, the sample introduction device 510 can be configured as an induction nebulizer, a non-induction nebulizer or a hybrid of the two, a concentric, cross flow, entrained, V-groove, parallel path, enhanced parallel path, flow blurring or piezoelectric nebulizers, a spray chamber, a chromatography device such as a gas chromatography device or other devices that can provide a sample to the ion source 520.

In some examples, the mass analyzer 530 may take numerous forms depending generally on the sample nature, desired resolution, etc. and exemplary mass analyzers may comprise one or more rod assemblies such as, for example, a quadrupole or other rod assembly. In some examples, the mass analyzer 530 may be, or may include, a time of flight device. In some instances, the mass analyzer 530 may comprise its own radio frequency generator. In certain examples, the mass analyzer 530 can be a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers (e.g., matrix-assisted laser desorbed ionization time of flight analyzers), and other suitable mass analyzers that can separate species with different mass-to-charge ratios. If desired, the mass analyzer 530 may comprise two or more different devices arranged in series, e.g., tandem MS/MS devices or triple quadrupole devices, to select and/or identify the ions that are received from the ion source 520.

In some examples, the detector 540 may be any suitable detection device that may be used with existing mass spectrometers, e.g., electron multipliers, Faraday cups, coated photographic plates, scintillation detectors, multichannel plates, etc., and other suitable devices that will be selected by the person of ordinary skill in the art, given the benefit of this disclosure.

In certain instances, the processor 550 typically includes a microprocessor and/or computer and suitable software for analysis of samples introduced into the MS device 500. One or more databases may be accessed by the processor 550 for determination of the chemical identity of species introduced into the MS device 500. Other suitable additional devices known in the art may also be used with the MS device 500 including, but not limited to, autosamplers, such as AS-90plus and AS-93plus autosamplers commercially available from PerkinElmer Health Sciences, Inc. It will also be within the ability of the person of ordinary skill in the art, given the benefit of this disclosure, to retrofit existing MS devices with the ion sources described herein and to design new MS devices using the ion sources described herein.

In some embodiments, a processor 550 is present, e.g., in a controller or as a stand-alone processor, to control and coordinate operation of the system 500 for the various modes of operation using the ion source. For this purpose, the processor can be electrically coupled to each of the ion source 520, the components of the mass analyzer 530, e.g., one or more pumps, one or more voltage sources, rods, etc., as well as any other voltage sources included in the system 500. In certain configurations, the processor may be present in one or more computer systems and/or common hardware circuitry including, for example, a microprocessor and/or suitable software for operating the system, e.g., to control the voltages of the ion source, pumps, mass analyzer, detector, etc. In some examples, any one or more components of the system 500 may comprise its own respective processor, operating system and other features to permit operation of that component. The processor can be integral to the systems or may be present on one or more accessory boards, printed circuit boards or computers electrically coupled to the components of the system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, calibrations and data during operation of the system in the various modes using the gas mixture. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system 500. For example, computer control can be implemented to control the pressure within the ion source 520, the voltages provided to the ion source 520 and/or lens elements, etc. The processor typically is electrically coupled to a power source which can, for example, be a direct current source, an alternating current source, a battery, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable nonvolatile recording medium in which codes can be stored that can be used by a program to be executed by the processor or information stored on or in the medium to be processed by the program. The medium may, for example, be a hard disk, solid state drive or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known Pentium class processors available from the Intel Corporation. Many other processors are also commercially available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C # (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the systems remotely as desired.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. An ion source comprising:
a chamber comprising a sample inlet configured to receive a sample comprising an analyte, the chamber further comprising an ion outlet configured to provide ions from the chamber; and
an electron source comprising a conductive helical coil configured to provide a magnetic field that accelerates electrons into the chamber as an accelerated electron beam along a longitudinal axis of the conductive helical coil, wherein the chamber further comprises an electron inlet and an electron collector opposite the electron inlet, wherein the electron collector and the electron inlet are arranged to direct the accelerated electron beam from the electron source through the electron inlet and along a path transverse to a path between the sample inlet and the ion outlet of the chamber.

2. The ion source of claim 1, wherein the sample inlet is generally opposite the ion outlet.

3. The ion source of claim 1, wherein the sample inlet is configured to receive a sample from a gas chromatograph.

4. The ion source of claim 1, wherein the electron source comprises a lens at the ion outlet, wherein the lens is configured to focus ions from the ion source.

5. The ion source of claim 1, wherein the chamber further comprises a charge plate configured to accelerate ions in the chamber.

6. The ion source of claim 1, wherein the chamber comprises at least two separate electron inlets spaced along one side of the chamber.

7. The ion source of claim 1, wherein the chamber comprises a second sample inlet configured to receive a second source of analyte.

8. The ion source of claim 7, wherein the chamber further comprises a gas inlet configured to provide a gas coaxially with the second sample introduced into the chamber.

9. The ion source of claim 8, wherein the gas inlet is configured to provide a reactant gas to react with analyte in the chamber.

10. The ion source of claim 8, wherein the gas inlet is configured to provide a bombarding gas.

11. An ion source comprising:
first and second opposing chambers, each of the first and second opposing chambers comprising a sample inlet each configured to receive a sample comprising an analyte, wherein each of the first and second opposing chamber further comprises an ion outlet, wherein each of the first and second opposing chambers further comprises an electron inlet configured to receive electrons from a respective one of first and second electron sources; and
an electron collector common to the first and second opposing chambers and arranged in opposition to the electron inlet of each of the first and second chambers, wherein the electron collector is arranged to direct an electron beam from each of the first and second electron sources along a path transverse to a path between the sample inlet and the ion outlet.

12. The ion source of claim 11, wherein the ion outlet of each of the first and second opposing chambers provides ions to a mass analyzer fluidically coupled to the ion source.

13. The ion source of claim 12, wherein the ion outlet of each of the first and second opposing chambers provides ions to a first multipole ion guide positioned between the mass analyzer and the ion source.

14. The ion source of claim 13, wherein the first multipole ion guide comprises a plurality of tilted rods.

15. The ion source of claim 14, wherein each of the plurality of tilted rods has a cross-section that varies along its length.

16. The ion source of claim 11, wherein each of the first and second chambers comprises a focusing lens at its ion outlet.

17. The ion source of claim 11, wherein the sample is received from a gas chromatograph.

18. The ion source of claim 11, wherein the electron source comprises a conductive helical coil comprising a longitudinal axis along which electrons are accelerated by a magnetic field.

19. The ion source of claim 11, wherein the chamber further comprises a charge plate configured to accelerate ions in the chamber.

20. The ion source of claim 11, wherein the second opposing chamber is configured to receive a gas to interact with the analyte in the sample.

* * * * *